United States Patent
Laing

(10) Patent No.: US 7,619,382 B2
(45) Date of Patent: Nov. 17, 2009

(54) SOLAR CIRCULATION PUMP AND METHOD FOR CONTROLLING A SOLAR CIRCULATION PUMP, FOR CONTROLLING THE STARTING OF AND FOR SETTING THE PERFORMANCE OF A SOLAR CIRCULATION PUMP

(75) Inventor: Oliver Laing, Stuttgart (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 64 days.

(21) Appl. No.: 11/728,179

(22) Filed: Mar. 22, 2007

(65) Prior Publication Data
US 2007/0285039 A1 Dec. 13, 2007

(30) Foreign Application Priority Data
Mar. 29, 2006 (DE) ........................ 10 2006 015 693

(51) Int. Cl.
*H02H 7/08* (2006.01)

(52) U.S. Cl. .......................... 318/400.21; 318/400.22; 318/400.01

(58) Field of Classification Search ........... 318/400.21, 318/400.22, 400.01, 400.17, 599; 388/804, 388/811
See application file for complete search history.

(56) References Cited

U.S. PATENT DOCUMENTS

| | | | | |
|---|---|---|---|---|
| 4,614,879 A | * | 9/1986 | Ault | 307/130 |
| 5,487,593 A | * | 1/1996 | Potts et al. | 303/11 |
| 6,140,797 A | * | 10/2000 | Dunn | 320/105 |
| 2007/0038534 A1 | * | 2/2007 | Canter | 705/35 |

* cited by examiner

*Primary Examiner*—Karen Masih
(74) *Attorney, Agent, or Firm*—Lipsitz & McAllister LLC

(57) ABSTRACT

To provide a solar circulation pump for connection to a photovoltaic panel device, comprising an electric motor which is electronically commutated and has a control device for supplying a periodic commutation signal, it is proposed that the control device be so configured that the commutation signal is varied with respect to the ratio of switch-on time to switch-off time.

26 Claims, 4 Drawing Sheets

SOLAR CIRCULATION PUMP AND METHOD FOR CONTROLLING A SOLAR CIRCULATION PUMP, FOR CONTROLLING THE STARTING OF AND FOR SETTING THE PERFORMANCE OF A SOLAR CIRCULATION PUMP

The present disclosure relates to the subject matter disclosed in German application number 10 2006 015 693.5 of Mar. 29, 2006, which is incorporated herein by reference in its entirety and for all purposes.

BACKGROUND OF THE INVENTION

The invention relates to a solar circulation pump for connection to a photovoltaic panel device, comprising an electric motor which is electronically commutated and has a control device for supplying a periodic commutation signal.

The invention further relates to a method for controlling a solar circulation pump which is supplied with electrical energy by a photovoltaic panel device, and which comprises an electronically commutated electric motor.

The invention further relates to a method for controlling the starting of a solar circulation pump which is supplied with electrical energy by a photovoltaic panel device, and which comprises an electronically commutated electric motor.

The invention further relates to a method for setting the performance of a solar circulation pump which is supplied with electrical energy by a photovoltaic panel device, and which comprises an electronically commutated electric motor.

Solar circulation pumps for connection to a photovoltaic panel device are used in conjunction with solar thermal collector devices. They serve to convey liquid medium, in particular, water, through the solar collector device in order to heat the medium. The photovoltaic panel device provides the necessary electrical energy for operating the solar circulation pump.

Since the solar radiation conditions vary, the supply of electrical energy to solar circulation pumps varies, which may prove problematic.

SUMMARY OF THE INVENTION

In accordance with the present invention, a solar circulation pump is provided, which, while being of simple design, has improved operating characteristics.

In accordance with an embodiment of the present invention, the control device is so configured that the commutation signal is varied with respect to the ratio of switch-on time to switch-off time.

The commutation signal ensures that rotation of a rotor of the electric motor takes place. Coils of the electric motor are activated by the commutation signal in a phase-shifted manner. Via a duty cycle, a variation takes place within the commutation signal, i.e., the ratio of switch-on time to switch-off time is varied. The percentage of the switch-on time in relation to a period of the commutation signal is thereby varied.

The solar radiation conditions vary, so that the electric power made available by the photovoltaic panel device fluctuates over time. As a result, the rotational speed of the solar circulation pump (as rotational speed of the rotor of the electric motor) may vary. Owing to the variation of the ratio of switch-on time to switch-off time in the commutation signal, maximization of the rotational speed under given insolation conditions can be achieved, as the optimized ratio of switch-on time to switch-off time can be found for given insolation conditions.

In particular, the commutation signal is continuously variable. As a result, a permanent variation of the ratio of switch-on time and switch-off time can be carried out in order to continuously ensure optimization of the solar circulation pump.

For example, a variation of the commutation signal in its shape and/or in its amplitude is provided. It is, in particular, known to operate an electronically commutated motor via block commutation. The corresponding commutation signal comprises stepped pulses. The ratio of switch-off time to switch-on time can be changed by changing the pulse length within a period.

Sine commutation, wherein the commutation signal comprises sine curves or sine envelopes, is also known. For example, the corresponding signal is generated from individual pulses which are adjusted in their pulse height so as to produce a sine curve. A variation of the ratio of switch-on time to switch-off time can be achieved by such signal pulses being multiplied by a duty cycle. The envelope amplitude of the sine curve is thereby varied, with the sine shape per se being maintained.

In particular, the variation of the commutation signal with respect to switch-on time and switch-off time (duty cycle) takes place on a time scale which is very much greater than a period of the commutation signal. This time scale of the variation is a time scale on which a variation of the solar radiation conditions is expected. In particular, it lies in the tenth-of-a-second range or greater.

It is expedient for the variation of the ratio of switch-on time and switch off time in the commutation signal to take place by steps of increasing or decreasing the ratio. In particular, a clocking back and forth of the duty cycle takes place with the aim of maximizing the rotational speed of the rotor of the electric motor.

It is quite particularly advantageous for the control device to comprise a control circuit in which the rotational speed of a rotor of the electric motor is the controlled magnitude, and the ratio of switch-on time and switch-off time in the commutation signal is the control quantity. In particular, this control circuit can be implemented by software in the control device. The duty cycle is varied so as to obtain the optimized, namely maximum, rotational speed. For example, starting from a specific ratio, the ratio of switch-on time to switch-off time is increased. If this results in an increase in the rotational speed, a further increase is carried out. If it results in a decrease in the rotational speed, a clocking in the other direction takes place.

In particular, it is provided that the control aim for the controlled magnitude is maximization of the rotational speed, in order to achieve optimized pumping performance. Self-optimization of the solar circulation pump can thereby be achieved in a simple way without any external control device being required. This self-optimization or self-control of the solar circulation pump can be implemented in a simple way by an integrated control device.

In particular, a measuring device is provided for the rotational speed or for a magnitude that characterizes the rotational speed. It is thereby made possible to determine the rotational speed in order to be able to vary the ratio of switch-on time and switch-off time in a deliberate manner and so achieve a maximized rotational speed.

In particular, the measuring device is formed by an integrated position transducer of the electric motor. This integrated position transducer comprises, for example, one or more Hall sensors.

It is, in principal, also possible for a power measuring device to be provided for the electric motor. The power is directly dependent on the rotational speed.

The control aim of maximization of the rotational speed corresponds to a control aim of maximization of the power.

The control circuit is expediently integrated into the electric motor. A simple and cost-effective construction is thereby obtained.

In accordance with an embodiment of the present invention, it is possible to check with the control device whether sufficient electrical energy is available for aligning and/or subsequently starting a rotor of the electric motor.

After initialization of the control device, the rotor of the electric motor is aligned, and after the alignment the electric motor is started. The energy required for this is made at least indirectly available by the photovoltaic panel device. It can happen that there is insufficient electrical energy for aligning and/or starting the electric motor. For example, in the morning a photovoltaic panel device supplies little current at high voltage. The solar circulation pump forms an ohmic resistance in the current circuit. A short circuit then occurs with an unsuccessful attempt at starting. A frequent unsuccessful clocking of the solar circulation pump can then occur when such starting short circuits happen. Basically, it is then the case that the aligning and/or the starting of the electric motor involves noise emission.

In the solution according to the invention, it is checked whether sufficient electrical energy is available without any movement of the rotor occurring. Unnecessary noise emission is thereby prevented if sufficient electrical energy is not available.

Furthermore, it can be ensured by the solution according to the invention that a buffer store can be charged to such an extent that sufficient electrical energy is available for aligning and starting the electric motor.

It is expedient for a buffer store for electrical energy to be associated with the electric motor. Electrical energy for enabling alignment of the rotor and starting of the electric motor is made available in this buffer store.

It is expedient for the buffer store to be integrated into the solar circulation pump or into the electric motor.

It is quite particularly advantageous for the buffer store to be arranged between a motor electronics assembly of the electric motor and the photovoltaic panel device. The buffer store can be charged by electrical energy made available by the photovoltaic panel device. This is then available for enabling alignment of the rotor and starting of the electric motor.

In particular, the buffer store is integrated into the solar circulation pump. It is then expedient for the buffer store to be arranged between the motor electronics assembly and an electric connection for the photovoltaic panel device.

It is quite particularly advantageous for a time slot between alignment of the rotor and starting of the electric motor to be prescribable by the control device. For example, the duration of such a time slot lies in the seconds range. It lies, for example, in the order of magnitude of three seconds. By prescribing the time slot, a decoupling with respect to time can be achieved between alignment of the rotor and starting of the electric motor (for permanent rotation of the rotor). It can thereby be ensured that after alignment of the rotor sufficient electrical energy will be available for starting the electric motor.

It can be provided that the electric motor comprises a plurality of coils, and that a load can be applied to a coil by the control device to check whether sufficient electrical energy is available for aligning the rotor and/or starting the electric motor. The load is applied, and a check is then carried out as to whether sufficient voltage can build up in the coil or whether this voltage collapses. If sufficient voltage can build up, full voltage is then applied to the electric motor in order to bring about alignment of the rotor and to start the electric motor.

It is expedient for the load to be so applied that no movement of the rotor of the electric motor occurs. In particular, a load is only applied to a single coil of the electric motor in order to prevent movement of the rotor.

It is quite particularly advantageous for the load to be applied to the coil by the control device after an initialization procedure prior to alignment of the rotor of the electric motor. Rotor movements involving noise emission are thereby prevented if sufficient electrical energy is not available for the starting. It can thereby also be ensured that a buffer store is sufficiently charged for ensuring alignment of the rotor and starting of the electric motor.

In accordance with an embodiment of the present invention, the control device comprises a setting device for setting in a fixable manner a bottom limit for voltage applied to the electric motor.

A solar circulation pump is connected to a solar collector device. The solar collector device can comprise a different number of solar collectors. The conveying capacity of the solar circulation pump must be adapted accordingly.

A solar circulation pump can be adapted to a wide variety of solar collector devices by a setting device according to the invention.

Therefore, the solar circulation pump can be set in a fixed manner during installation of the system so as to achieve an optimized mode of operation.

A bottom limit for voltage applied to the electric motor is thereby set in a fixed manner, the actual value of the bottom limit being dependent upon the construction of the solar collector device.

A throttling of the performance of the solar circulation pump can thereby be set, which is so configured that whenever there is a decrease in the insolation, the conveying capacity of the pump drops at least approximately proportionally. An unnecessary rearrangement in a medium reservoir is thereby prevented and a stratification achieved. A self-optimization of the solar circulation pump, which is adapted to the corresponding solar collector device, can be achieved by providing a setting device.

In particular, the bottom limit for voltage application is in relation to a maximum no-load voltage of the photovoltaic panel device.

It is expedient for a throttling of the performance of the solar circulation pump to be settable by the setting device. The conveying capacity and the reduction in the conveying capacity, adapted to the solar collector device to which the solar circulation pump is connected, can thereby be set in an optimized manner.

In particular, the bottom limit for voltage application is settable in a fractional range of the maximum no-load voltage of the photovoltaic panel device by the setting device. As the voltage increases, the power of a photovoltaic panel device (I×U) rises to a maximum and then drops. Towards the maximum no-load voltage the power drops. By setting a bottom voltage it is ensured that an adapted conveying capacity is also obtained whenever there is a decrease in the insolation.

In particular, the fractional range lies between at least 50% and at the most 95% of the maximum no-load voltage. The range depends on how the solar collector device is constructed. If it contains a large number of solar collectors, the fractional range is then more likely to lie at 50%. If it contains only one solar collector, the fractional range is then more likely to lie at 95%.

The electric motor is, for example, a brushless DC motor. It can comprise a permanent-magnetic stator.

In accordance with the present invention, a method for controlling a solar circulation pump is provided, which can be performed in a simple way.

In accordance with an embodiment of the present invention, a commutation signal is continuously varied with respect to the ratio of switch-on time and switch-off time.

In accordance with the present invention, a method for controlling the starting of a solar circulation pump is provided, which enables effective operation of a solar collector array.

In accordance with an embodiment of the present invention, prior to suitable initiation of rotation of the rotor, a check is carried out as to whether sufficient electrical energy is available for aligning the rotor and/or starting the electric motor.

In accordance with the present invention, a method for setting the performance of a solar circulation pump is provided, whereby the solar circulation pump is adaptable to a given solar collector device.

In accordance with an embodiment of the present invention, a bottom limit is set for voltage applied to the electric motor.

The above-mentioned methods can also be employed in combination in a solar circulation pump. All three methods can be put into practice or two of these methods can be put into practice.

The following description of preferred embodiments serves to explain the invention in more detail in conjunction with the drawings.

DETAILED DESCRIPTION OF THE INVENTION

Figure 1:
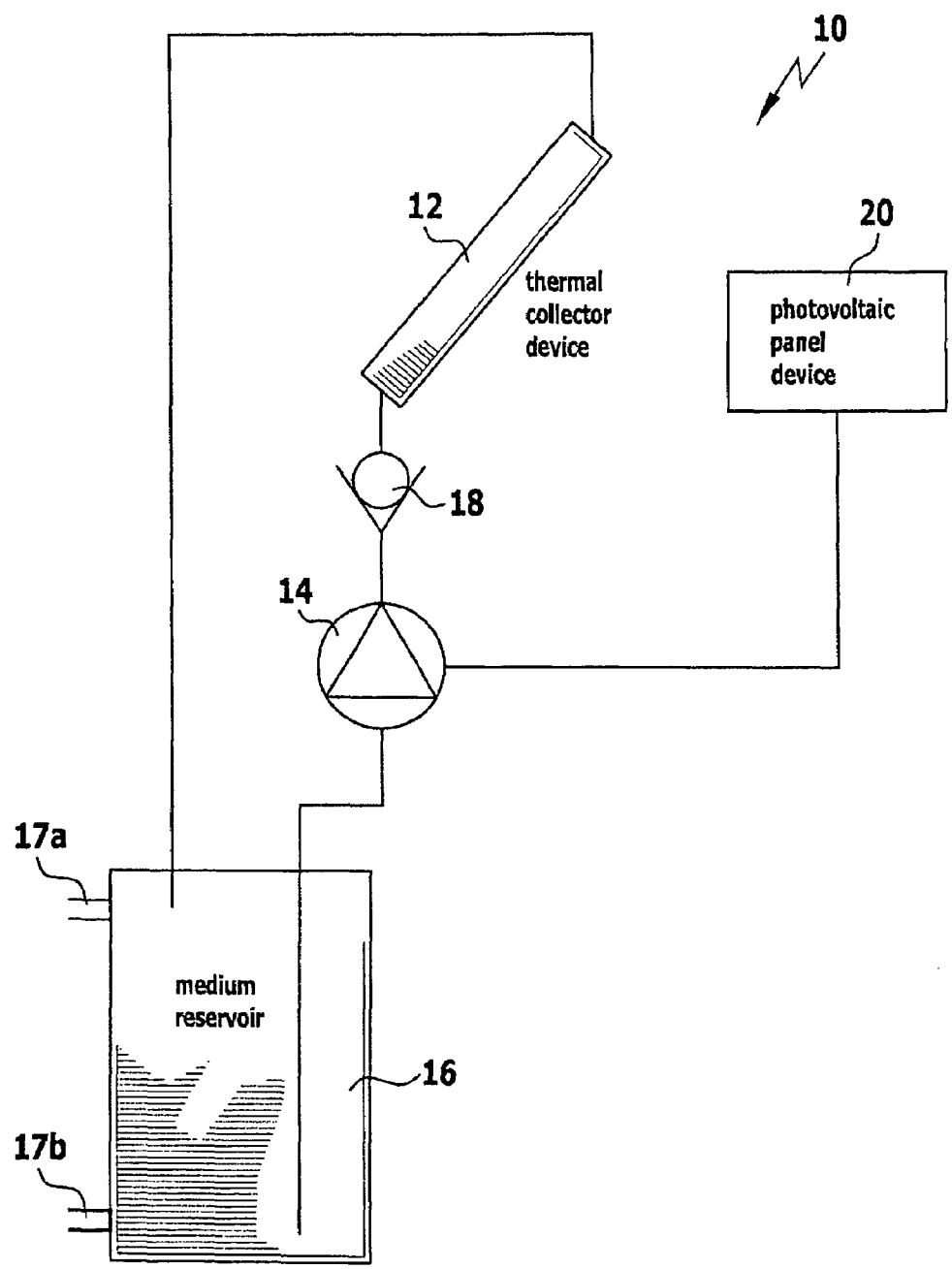
FIG. 1 a schematic representation of a solar collector array with a photovoltaic panel device and a solar circulation pump.

A solar thermal array (solar collector array), shown schematically in FIG. 1 and designated 10 therein, comprises a solar thermal collector device 12 where a liquid medium, in particular, water, is solar thermally heatable. A solar circulation pump 14 is provided for conveying the medium. The solar circulation pump 14 is arranged between a medium reservoir 16 and the solar thermal collector device 12. Medium is conveyed by the solar circulation pump 14 from the medium reservoir 16 to the solar thermal collector device 12 in order to heat it there. Heated medium is returned from the solar thermal collector device 12 to the medium reservoir 16. Medium (heated) can be withdrawn from the medium reservoir 16 at an (upper) outlet 17a. Accordingly, a charging device is provided for replenishing medium (to be heated) via a (bottom) inlet 17b when medium is withdrawn.

A check valve 18 is arranged between the solar circulation pump 14 and the solar thermal collector device 12 for ensuring that medium is unable to flow back from the solar collector device 12 to the solar circulation pump 14.

The solar circulation pump 14 is operated by solar energy. For this purpose, it is connected to a photovoltaic panel device 20 which provides the electrical energy required for operating the solar circulation pump 14.

The photovoltaic panel device 20 is located in spatial relationship to the solar thermal collector device 12. This relationship is preferably such that at least approximately the same solar radiation conditions prevail for the photovoltaic panel device 20 and for the solar thermal collector device 12.

The solar circulation pump 14 comprises an electric motor 22 (FIG. 2) with a rotor 26 rotatable about an axis of rotation 24. The electric motor 22 also has a stator 28.

The electric motor 22 is an electronically commutated electric motor, for example, a brushless DC motor. In the exemplary embodiment shown in FIG. 2, the rotor 26 is of permanent-magnetic design, and a plurality of coils 30a, 30b, 30c are arranged on the stator 28. A periodic commutation signal is applied to the coils 30a, 30b, 30c. The partial commutation signals for the respective coils 30a, 30b, 30c are phase-shifted in relation to one another. With three coils, the phase shift is 120°.

It is, in principle, also possible for the stator to be of permanent-magnetic design and for the rotor to have a plurality of coils to which a commutation signal is applied.

Figure 2:
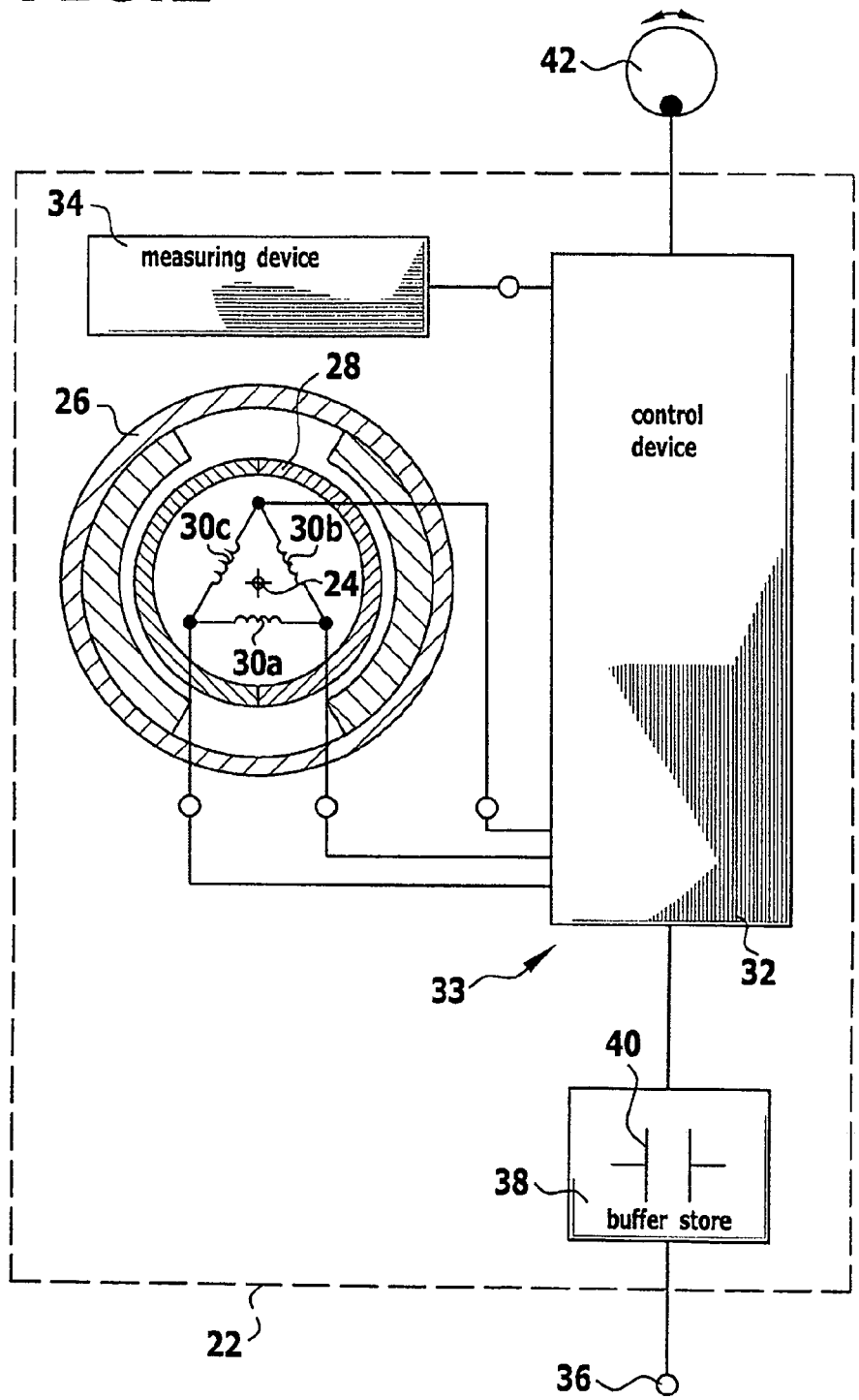
FIG. 2 a schematic representation of an exemplary embodiment of an electric motor of a solar circulation pump according to the invention.

In the exemplary embodiment shown in FIG. 2, the stator 28 is located on the inside and the rotor 26 on the outside (external rotor). It is also possible for the rotor 26 to be on the inside (internal rotor) and for the stator 28 to be on the outside.

An impeller of the solar circulation pump 14 is rotationally fixedly connected to the rotor 26.

The rotor 26 can be mounted for rotation about the axis of rotation 24 by means of a rotor shaft. It is, for example, also possible for the rotor 26 to be rotatably mounted with respect to the stator 28 by means of a spherical bearing.

The electric motor 22 comprises a control device 32 which is coupled to the coils 30a, 30b, 30c in order to supply these with the commutation signal.

The control device 32 can be totally or partially implemented as an integrated circuit. In particular, it comprises one or more processors. It forms, in particular, a motor electronics assembly 33 or at least part of this.

Associated with the rotor 26 is a measuring device 34 for measuring the rotational speed of the rotor 26. This measuring device 34 is connected to the control device 32.

For example, the measuring device 34 is configured as a position transducer and, in particular, an integrated position transducer, comprising, for example, one or three Hall ICs.

The electric motor 22 receives its electrical energy from the photovoltaic panel device 20. It has a corresponding connection device 36 for connection to the photovoltaic panel device 20.

Associated with the electric motor 22 is a buffer store 38 for electrical energy. This buffer store 38 is arranged between the motor electronics assembly 33 and the photovoltaic panel device 20. The buffer store 38 can be charged by electrical energy supplied by the photovoltaic panel device 20. The buffer store 38 provides electrical energy for aligning/starting the rotor 26.

In particular, the buffer store 38 is coupled to the control device 32.

The buffer store 38 comprises one or more capacitors 40 for buffer storage of electrical energy.

In particular, the buffer store 38 is integrated into the solar circulation pump 14 or the electric motor 22.

Associated with the control device 32 is a setting device 42 for setting the minimum voltage applied to the electric motor 22. This minimum voltage is settable in a fixed manner by the setting device 42. As will be described in more detail hereinbelow, a throttling of the performance of the solar circulation pump 14 can thereby be set in a fixed manner for adaptation to the number of collectors of the solar thermal collector device 12.

The fixed setting of the minimum voltage applied to the electric motor 22 by means of the setting device 42 is carried out, in particular, when installing the solar thermal array 10.

The solar circulation pump 14 according to the invention operates as follows:

When solar radiation acts on the solar thermal array 10, the solar circulation pump 14 is supplied with electrical energy by the photovoltaic panel device 20. If sufficient energy is supplied, the rotor 26 is rotated and drives the impeller of the solar circulation pump 14.

Liquid medium is thereby conveyed and transported through the solar thermal collector device 12. The liquid medium heats up there. Heated medium is returned to the medium reservoir 16, from which it can be withdrawn as required.

The solar radiation conditions vary over time. For example, when the sky is cloudy, less electrical energy is available for operating the electric motor 22.

When starting the solar circulation pump 14, the control device 32 and, in particular, a processor included therein, is first initialized. The rotor 26 must then be aligned in relation to the stator 28 so as to initiate a rotational movement. The corresponding energy for aligning the rotor 26 comes from the buffer store 38.

After alignment of the rotor 26, it can start if sufficient electrical energy is available. The electrical energy for the starting again comes from the buffer store 38.

In accordance with the invention, it is provided that after initialization of the control device 32 a check is carried out as to whether sufficient electrical energy is available for aligning the rotor 26 and/or starting the rotor 26. For example, a load is applied to one of the coils 30a, 30b, 30c. A check is then carried out as to whether a sufficiently large voltage can build up when the load is applied or whether the voltage collapses. The load is applied in such a way that the rotor 26 does not rotate.

This procedure prevents alignment of the rotor 26 and/or starting from occurring if sufficient electrical energy is not available. The aligning of the rotor 26 and/or the starting involves noise emission. Unnecessary noise emission is prevented by the testing method according to the invention.

It is further ensured that the buffer store 38 cannot become charged. A decoupling with respect to time takes place between the aligning and/or the starting of the rotor 26 and the charging of the buffer store 38. The solar circulation pump 14 is prevented from starting immediately after initialization of the control device 32. A check is first made as to whether sufficient electrical energy is available. Furthermore, a time slot is placed between the aligning of the rotor 26 and the starting of the electric motor 22 by the control device 32. The length of this time slot lies, for example, in the order of magnitude of three seconds. It is thereby ensured that after the alignment of the rotor 26 with the corresponding energy consumption, the buffer store 38 is filled up again to such an extent that sufficient energy is available for starting the electric motor 22.

The solar circulation pump 14 can be operated in an effective manner by this procedure according to the invention.

Figure 3:
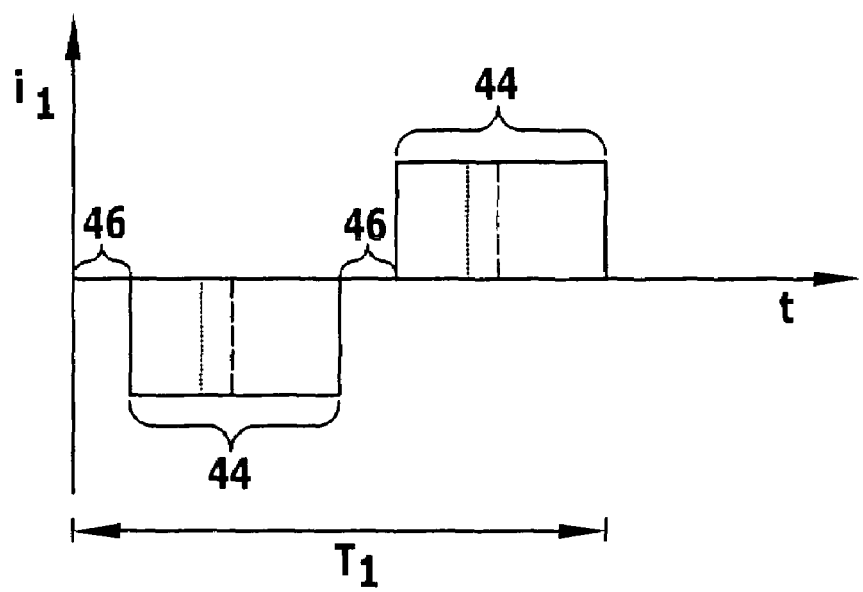
FIG. 3 a schematic representation of part of an example of a commutation signal.

During operation of the electric motor 22, the commutation signal is applied to the coils 30a, 30b, 30c of the electric motor 22 via the control device 32. Part of an example of a commutation signal is shown schematically as current $i_1$ for the coil 30a in FIG. 3. The partial commutation signal shown in FIG. 3 is step-shaped. Corresponding commutation signals are used in block commutation. The commutation signal is periodic.

The commutation signal is made up of the partial commutation signals for the coils 30a, 30b, 30c, the partial commutation signals being phase-shifted through 120° in relation to one another.

In accordance with the invention, it is provided, during operation of the solar circulation pump 14, that the ratio of switch-on time to switch-off time (duty cycle) is varied by the control device 32. The switch-on time is indicated by reference numeral 44 for part of the commutation signal for a period with the duration $T_1$ in FIG. 3. The switch-off time is indicated by reference numeral 46. By variation of the ratio of switch-on time 44 to switch-off time 46 the control device 32 sets the switch-on quota in the commutation signal.

In FIG. 3, other ratios of switch-on time 44 to switch-off time 46 are indicated by dashed and dotted lines.

Figure 4:
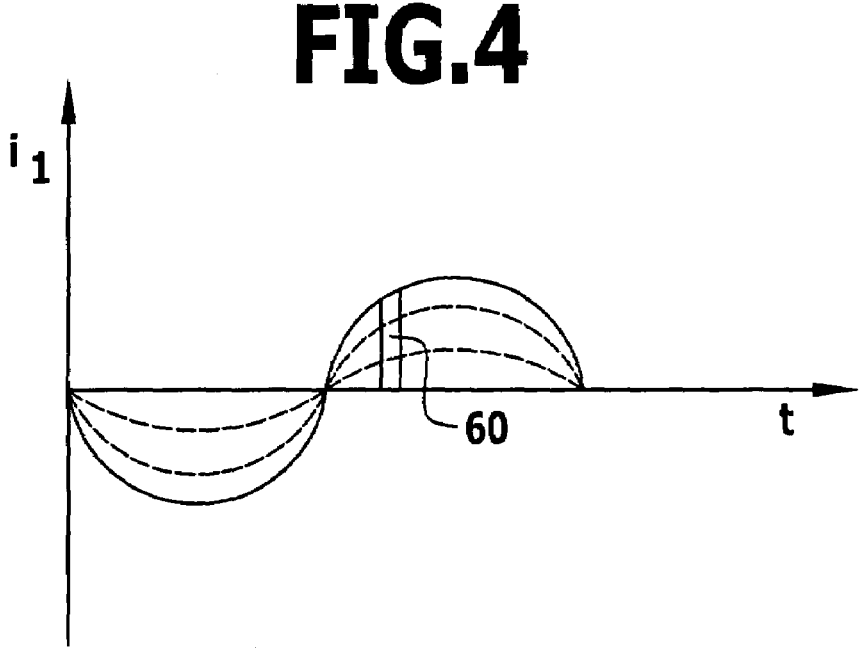
FIG. 4 a schematic representation of part of a further example of a commutation signal.

For example, a sinusoidal commutation can also be provided. A corresponding partial commutation signal for coil 30a is shown in FIG. 4. This (periodic) commutation signal is made up of individual steps having such a height that their combination results after smoothing in a sine curve. The individual steps 60 are produced by corresponding semiconductor components of the motor electronics assembly 33. The period for generation of the steps 60 lies, for example, in the order of magnitude of 20 kHz.

The height of the steps 60 is variable. A duty cycle is then superimposed on the step formation by the motor electronics assembly 33. The ratio of switch-off time to switch-on time can thereby be varied.

This superimposition of a (slow) duty cycle corresponds to a variation of the amplitude or envelope amplitude of the sine curve of the commutation signal. The shape of the commutation signal as sine signal remains unchanged, only the amplitude or envelope amplitude changes.

In the case of a sine commutation signal, the ratio of switch-on time and switch-off time is achieved by variation of amplitude or envelope amplitude.

The control device 32 comprises a control circuit which, in particular, is implemented by software. The controlled magnitude of this control circuit is the rotational speed of the rotor 26 of the electric motor 22. The control aim for this controlled magnitude is maximization of the rotational speed in order to achieve maximum performance of the solar circulation pump 14. The control quantity (reference quantity) is the ratio of the switch-on time 44 to the switch-off time 46 (duty cycle).

The procedure is such that a constant variation of the duty cycle takes place, namely in the direction towards achieving the control aim of maximum rotational speed. Herein the ratio of switch-on time 44 to switch-off time 46 is varied, with this variation preferably taking place in steps. The time scale of this variation is adapted to a typical time scale for changes in the solar thermal radiation conditions. For example, this time scale lies in the order of magnitude of one second. This time scale is slow in relation to the time scale of the commutation signal.

If the commutation signal has a frequency of 20 kHz, the period duration $T_1$ is then 50 µs. The time scale of the variation is slower by a factor of 20,000.

The controlling is carried out in such a way that, starting from a specific ratio of switch-on time 44 to switch-off time 46, the ratio is, for example, increased. A check is then made as to whether the rotational speed is increased or decreased. In the case of a decrease in the rotational speed, the ratio is changed in the other direction. In the case of an increase in the rotational speed, the same direction will be maintained.

In accordance with the invention, a clocking back and forth of the ratio of the switch-on time 44 to the switch-off time 46 takes place so as to achieve a maximum rotational speed. The measuring device 34 is used to check the rotational speed.

It can also be provided that a measuring device is associated with the electric motor 22 for measuring its power. The power of the electric motor 22 is a magnitude that characterizes the rotational speed.

Owing to the solution according to the invention, rotational speed control which is carried out via the integrated control device 32 can be integrated into the electric motor 22. Optimization of the performance can thereby be achieved in a simple way during operation of the solar circulation pump 14, even under varying solar radiation conditions.

This control can be carried out in a simple way.

The setting device 42 serves to optimize the solar circulation pump 14 in conjunction with the solar thermal collector device 12. Optimization can be achieved by means of the setting device 42 during the installation.

The solar thermal collector device 12 can comprise a varying number of solar collectors, depending on the prevailing conditions. The solar circulation pump 14 can be adapted by means of the setting device 42.

Figure 5:
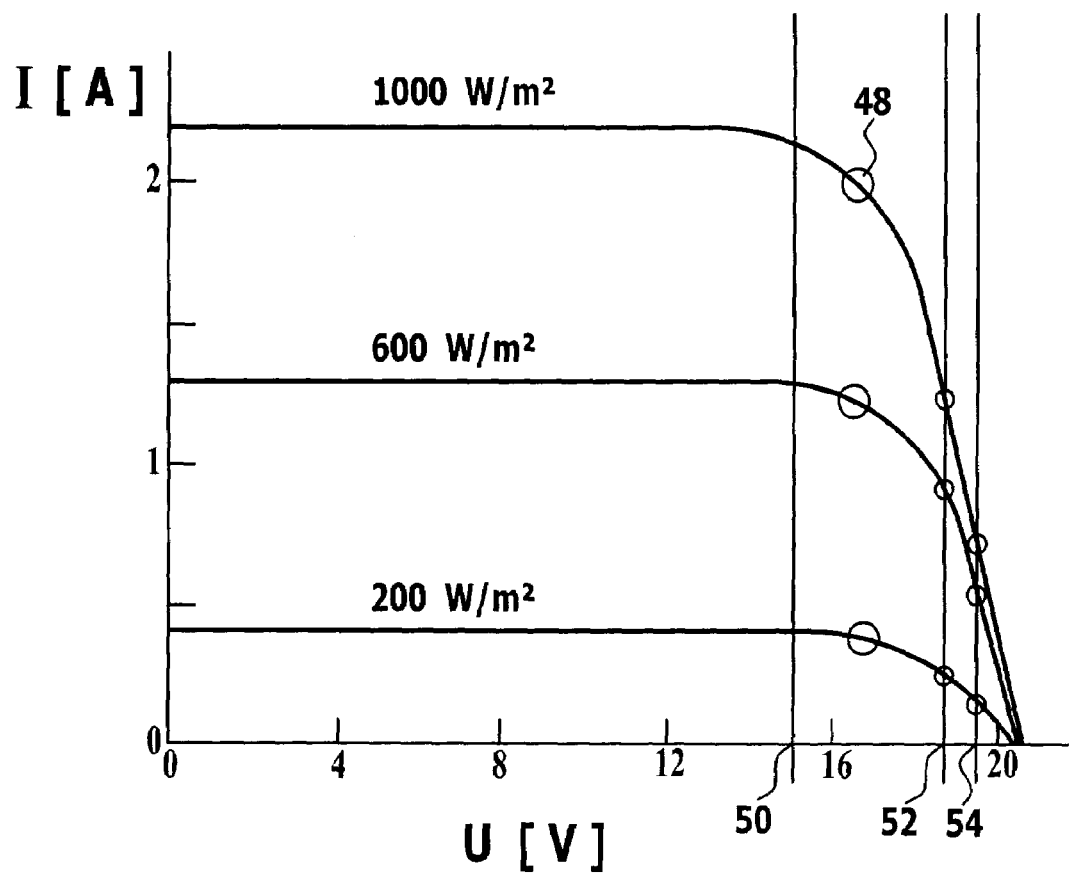
FIG. 5 a current-voltage diagram of a photovoltaic panel device under various insolation conditions.

FIG. 5 shows an I-U diagram of a photovoltaic panel device 20 for various solar radiation conditions. The electric power I×U supplied by the photovoltaic panel device 20 increases with an increase in the voltage until it reaches a maximum and then drops. In the diagram in FIG. 5, the maximum power is indicated by a circle. For the solar radiation strength of 1000 W/m$^2$ the point of maximum power is indicated by reference numeral 48.

The minimum voltage applied to the electric motor 22 and hence to the solar circulation pump 14 by the control device 32 is set by the setting device 42.

This minimum voltage is set in a fixed manner. As is apparent from the diagram according to FIG. 5, above the maximum, an increase in the voltage beyond the point of maximum power results in a drop in the power. Therefore, the maximum-performance of the solar circulation pump 14, adapted to the number of solar collectors of the solar thermal device 12, can be set by the setting device 42.

The setting is carried out during the installation in dependence upon the number of solar thermal collectors of the solar thermal collector device 12. The setting is carried out in relation to the no-load voltage of the photovoltaic panel device 20, in particular, as a specific percentage. The no-load voltage of the photovoltaic panel device 20 (at zero current) can be measured.

If there is a large number of solar thermal collectors in the solar thermal collector device 12, then a small minimum voltage can be set. This is indicated by reference numeral 50 in FIG. 5. With this minimum voltage, proximity to the maximum prevails. A decrease in the solar radiation power will then also result in an at least approximately proportional decrease in the power and hence in a corresponding decrease in the conveying capacity of the solar circulation pump 14. It is thereby ensured that in the event of a decrease in the solar radiation, the performance of the solar circulation pump will be reduced accordingly so as to prevent too strong a circulation of medium in the medium reservoir 16. (If the medium is not sufficiently heated in the solar thermal collector device 12, then a complete circulation of the medium in the medium reservoir 16 is not desired either.)

When the solar thermal collector device 12 contains a smaller number of solar collectors, it is then advantageous for the minimum voltage to be selected higher. This is indicated by reference numeral 52 in FIG. 5. When there is a small number of solar collectors, a lower conveying capacity is then also required. A throttling of the performance, which is set in a fixed manner, is achieved by the minimum voltage being selected higher, i.e., the minimum voltage 52 is higher than the minimum voltage 50. In turn, as is apparent from the diagram according to FIG. 5, an at least approximately proportional reduction in the conveying capacity is thereby achieved when the insolation power sinks. Too large a quantity of medium is, in turn, thereby prevented from being circulated.

With an even smaller number of solar collectors for the solar thermal collector device 12, it is advantageous for an even higher minimum voltage to be selected. This is indicated by reference numeral 54 in FIG. 5. (For example, the minimum voltage 50 corresponds to a setting for ten solar collectors, the minimum voltage 52 to a setting for three solar collectors, and the minimum voltage 54 to a setting for one solar collector.) With this setting, an at least approximately proportional reduction in the conveying capacity is, in turn, achieved in the case of a decrease in the solar thermal radiation conditions.

Preferably, a minimum voltage 50, 52, 54, which ranges between at least 50% and at the most 95% of the maximum no-load voltage of the photovoltaic panel device 20, is set by the setting device 42.

Owing to the solution according to the invention, an at least approximate linearization is achieved for different solar thermal collector devices 12 (with a different number of solar collectors) with a self-optimizing pump which is adapted to the circulation requirements of the corresponding solar thermal array 10. During the installation, the minimum voltage 50, 52, 54 is set in a fixed manner by means of the setting device 42 in order to optimize the given system.

This setting can be carried out in a simple way.

The invention claimed is:

1. Solar circulation pump for connection to a photovoltaic panel device, comprising:
    an electric motor which is electronically commutated and which has a control device for supplying a periodic commutation signal and a rotor rotatable about an axis of rotation; and
    a measuring device for determining a rotational speed of the rotor or a magnitude that characterizes the rotational speed;
    wherein:
        the control device is so configured that the commutation signal is varied with respect to a ratio of switch-on time to switch-off time;
        the control device comprises a control circuit in which the rotational speed of the rotor of the electric motor is a controlled magnitude, and the ratio of switch-on time and switch-off time in the commutation signal is a control quantity, and
        a control aim for the controlled magnitude is maximization of the rotational speed.

2. Solar circulation pump in accordance with claim 1, wherein the commutation signal is continuously variable.

3. Solar circulation pump in accordance with claim 1, wherein a variation of the commutation signal in at least one of its shape and its amplitude is provided.

4. Solar circulation pump in accordance with claim 1, wherein the variation of the commutation signal with respect to switch-on time and switch-off time takes place on a time scale which is very much larger than a period of the commutation signal.

5. Solar circulation pump in accordance with claim 4, wherein the variation of the commutation signal with respect to switch-on time and switch-off time takes place on a time scale lying in an order of magnitude of greater than one tenth of a second.

6. Solar circulation pump in accordance with claim 1, wherein the variation of the ratio of switch-on time and switch-off time takes place in the commutation signal by steps of increasing or decreasing the ratio.

7. Solar circulation pump in accordance with claim 1, wherein the measuring device is formed by an integrated position transducer of the electric motor.

8. Solar circulation pump in accordance with claim 1, wherein a power measuring device is provided for the electric motor.

9. Solar circulation pump in accordance with claim 1, wherein the control circuit is integrated into the electric motor.

10. Solar circulation pump in accordance with the claim 1, further comprising:
    determining with the control device whether sufficient electrical energy is available for at least one of aligning and subsequently starting the rotor of the electric motor.

11. Solar circulation pump in accordance with claim 10, wherein a buffer store for electrical energy is associated with the electric motor.

12. Solar circulation pump in accordance with claim 11, wherein the buffer store is integrated into the solar circulation pump.

13. Solar circulation pump in accordance with claim 11, wherein the buffer store is integrated into the electric motor.

14. Solar circulation pump in accordance with claim 11, wherein the buffer store is arranged between a motor electronics assembly of the electric motor and the photovoltaic panel device.

15. Solar circulation pump in accordance with claim 14, wherein the buffer store is arranged between the motor electronics assembly and an electric connection for the photovoltaic panel device.

16. Solar circulation pump in accordance with claim 1, wherein a time slot between aligning the rotor and starting the electric motor is prescribable by the control device.

17. Solar circulation pump in accordance with claim 10, wherein the electric motor comprises a plurality of coils, and the control device is configured to apply a load to one of the coils in order to check whether sufficient electrical energy is available for at least one of aligning the rotor and starting the electric motor.

18. Solar circulation pump in accordance with claim 17, wherein the load is applied in such a way that no movement of the rotor of the electric motor takes place.

19. Solar circulation pump in accordance with claim 17, wherein the load is applied to the coil by the control device after an initialization procedure before aligning the rotor of the electric motor.

20. Solar circulation pump in accordance with claim 1, wherein the control device comprises a setting device by means of which a bottom limit for applying voltage to the electric motor is settable in a fixed manner.

21. Solar circulation pump in accordance with claim 20, wherein a throttling of a performance of the solar circulation pump is settable by the setting device.

22. Solar circulation pump in accordance with claim 20, wherein the bottom limit for applying voltage is settable in a fractional range of a maximum no-load voltage of the photovoltaic panel device by the setting device.

23. Solar circulation pump in accordance with claim 22, wherein the fractional range lies between at least 50% and at the most 95% of the maximum no-load voltage.

24. Solar circulation pump in accordance with claim 1, wherein the electric motor is a brushless DC motor.

25. Solar circulation pump in accordance with claim 1, wherein the electric motor comprises a permanent-magnetic rotor or a permanent-magnetic stator.

26. Solar circulation pump for connection to a photovoltaic panel device, comprising:
    an electric motor which is electronically commutated and has a control device for supplying a periodic commutation signal; and
    a buffer store for storing electrical energy for at least one of aligning a rotor of the electric motor and starting the electric motor;
    wherein the control device checks whether sufficient electrical energy is available from the buffer store for the at least one of aligning and subsequently starting the rotor of the electric motor and does not initiate starting of the electric motor in the event that insufficient electrical energy is detected.

* * * * *